(12) United States Patent
Ruppert

(10) Patent No.: US 11,228,267 B2
(45) Date of Patent: Jan. 18, 2022

(54) ELECTRIC DRIVE DEVICE

(71) Applicant: Rolls-Royce Deutschland Ltd & Co KG, Blankenfelde-Mahlow (DE)

(72) Inventor: Swen Ruppert, Möhrendorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 7 days.

(21) Appl. No.: 16/651,522

(22) PCT Filed: Sep. 20, 2018

(86) PCT No.: PCT/EP2018/075433
§ 371 (c)(1),
(2) Date: Mar. 27, 2020

(87) PCT Pub. No.: WO2019/063400
PCT Pub. Date: Apr. 4, 2019

(65) Prior Publication Data
US 2020/0266746 A1    Aug. 20, 2020

(30) Foreign Application Priority Data

Sep. 28, 2017   (DE) .......................... 102017217298.3

(51) Int. Cl.
*H02P 21/30*      (2016.01)
*H02P 27/12*      (2006.01)

(52) U.S. Cl.
CPC .............. *H02P 21/30* (2016.02); *H02P 27/12* (2013.01)

(58) Field of Classification Search
CPC ................................ H02P 21/30; H02P 27/12
(Continued)

(56) References Cited

U.S. PATENT DOCUMENTS 5,757,596 A * 5/1998 Weber ................. H02H 7/0833
                                                 361/115
7,075,267 B1 * 7/2006 Cheng ............... H02M 7/53875
                                                 318/807
(Continued)

FOREIGN PATENT DOCUMENTS

DE       19758128 B4    12/2005
DE    102014113542 A1    3/2016
(Continued)

OTHER PUBLICATIONS

German Search Report for German Application No. 10 2017 217 298.3 dated Jun. 28, 2018.
(Continued)

*Primary Examiner* — David Luo
(74) *Attorney, Agent, or Firm* — Lempia Summerfield Katz LLC

(57) ABSTRACT

The disclosure relates to an electrical drive device having: an inverter including an inverter unit for each phase; a control unit configured to control the inverter units by application of vector control; and a rotating electrical machine having a stator that includes a plurality of phase windings connected to the inverter units. Each of the phase windings includes a first part-winding and an electrically isolated second part-winding. The inverter units include a first phase module and a second phase module. The phase modules deliver the electrical phase assigned to the respective inverter unit in a separate and a mutually electrically isolated manner. The first part-winding is electrically connected to the first phase module and the second part-winding is electrically connected to the second phase module.

20 Claims, 3 Drawing Sheets

(58) Field of Classification Search
USPC .............................. 318/400.02, 400.01, 700
See application file for complete search history.

(56) References Cited

U.S. PATENT DOCUMENTS

| | | | | |
|---|---|---|---|---|
| 7,723,874 B2* | 5/2010 | Woody | ..................... | H02K 9/20 |
| | | | | 310/52 |
| 8,369,049 B2* | 2/2013 | Kuehner | ................ | B65D 88/68 |
| | | | | 361/3 |
| 9,531,309 B2* | 12/2016 | Nakao | ................. | F16H 61/0265 |

FOREIGN PATENT DOCUMENTS

| | | |
|---|---|---|
| DE | 102014226570 A1 | 6/2016 |
| DE | 102015220366 A1 | 4/2017 |
| EP | 0502875 B1 | 8/1994 |
| EP | 1792770 A2 | 6/2007 |

OTHER PUBLICATIONS

International Search Report and the Written Opinion for International Patent Application PCT/EP2018/075433 dated Jan. 15, 2019.
Jack, Alan G., Barrie C. Mecrow, and James A. Haylock. "A comparative study of permanent magnet and switched reluctance motors for high-performance fault-tolerant applications." IEEE transactions on industry applications 32.4 (1996): 889-895.

* cited by examiner

ELECTRIC DRIVE DEVICE

The present patent document is a § 371 nationalization of PCT Application Serial No. PCT/EP2018/075433, filed Sep. 20, 2018, designating the United States, which is hereby incorporated by reference, and this patent document also claims the benefit of German Patent Application No. 10 2017 217 298.3, filed Sep. 28, 2017, which is also hereby incorporated by reference.

TECHNICAL FIELD

The disclosure relates to an electrical drive device having an inverter for the delivery of a multi-phase AC electric voltage, wherein the inverter, for the delivery of a respective phase of the multi-phase AC electric voltage, for each phase, includes at least one inverter unit which is assigned to the respective phase, a control unit which is configured to control the inverter units by the application of vector control, and a rotating electrical machine having a stator and a rotor which is rotatably arranged in relation to the stator, wherein the stator includes: a plate stack, a stator winding, which includes a plurality of phase windings which are connected to the respective inverter units, in order to energize the respective phase windings with the correspondingly assigned phase of the multi-phase AC electric voltage. The disclosure further relates to a method for operating an electrical drive device, in which phase windings of a stator winding of a stator of a rotating electrical machine of the electrical drive device are energized with phases of a multi-phase AC electric voltage which are assigned to respective phase windings, wherein the phases are delivered by inverter units of an inverter of the electrical drive device which are respectively assigned to the phases, and the inverter units are controlled by the application of vector control.

BACKGROUND

Electrical drive devices of the generic type, and methods for the operation thereof, are extensively known from the prior art, such that no separate published evidence hereof is required. An electrical drive device is a device, the function of which is to provide a mechanical drive function, (e.g., a mechanical movement or the like), by the use of electrical energy. The drive function may be provided as a motor function and as a generator function.

To this end, the electrical drive device may include at least one electrical machine, (e.g., a rotating electrical machine), which is electrically connected to an inverter and, by the inverter, is energized with an AC voltage in an appropriate manner. In some specific cases, the rotating electrical machine may also be energized with an appropriate DC voltage, wherein the inverter is then configured as a DC/DC converter.

By the control unit, the inverter may be controlled in an appropriate manner, such that the rotating electrical machine executes the desired drive functionality. The drive functionality may be a rotary motion, in the case of which the rotating electrical machine delivers a torque in a predeterminable manner.

The function of electrical drive devices is the delivery of drive functionalities of various types. Thus, electrical drive devices may be employed, for example, for the propulsion of motor vehicles. Moreover, however, electrical drive devices may also be employed in industry, (e.g., in production lines, in construction machinery, or the like). Meanwhile, moreover, electrical drive devices are also under consideration in air travel, for example, for the propulsion of propellers, by which an aircraft is driven, or the like.

In particular, special measures are required for applications in air travel, on the grounds that the latter, in addition to a requirement for the lowest possible weight, simultaneously is also to dictate a particular requirement with respect to reliability in regulation operation. Thus, inter alia, in the event of a short-circuit in part of a winding of the electrical machine, a total failure should be prevented, insofar as possible. Moreover, in the event of such an occurrence, the overall impact on the electrical drive device, in particular on the rotating electrical machine, should of course be able to be kept as low as possible.

SUMMARY AND DESCRIPTION

The object of the disclosure is therefore to improve the reliability of the electrical drive device, and to also disclose a method for this purpose.

The scope of the present disclosure is defined solely by the appended claims and is not affected to any degree by the statements within this summary. The present embodiments may obviate one or more of the drawbacks or limitations in the related art.

With respect to a generic electrical drive device, it is in particular proposed that each of the phase windings includes a first part-winding and a second part-winding that is electrically isolated from the first part-winding, the inverter units which are assigned to the respective phases respectively include a first and a second phase module, wherein the phase modules of one of the respective inverter units are configured to deliver the electrical phase of the multi-phase AC electric voltage which is assigned to the respective inverter unit in a separate and a mutually electrically isolated manner, and wherein the respective first part-winding is electrically connected to the corresponding first phase module and the respective second part-winding is electrically connected to the corresponding second phase module.

With respect to a generic method, it is in particular proposed that each of the phase windings includes a first part-winding and a second part-winding that is electrically isolated from the first part-winding, and the inverter units which are assigned to the respective phases respectively include a first and a second phase module, wherein the phase modules of one of the respective inverter units deliver the electrical phase of the multi-phase AC electric voltage which is assigned to the respective inverter unit in a separate and a mutually electrically isolated manner, wherein the respective first part-winding of the corresponding first phase module and the respective second part-winding of the corresponding second phase module are energized with the respectively assigned phases.

The disclosure is based on the concept that, by a two-fold division on both the inverter side and the phase winding side, redundancy may be provided which, in the event of the occurrence of a malfunction in one region of a phase winding, (e.g., a part-winding of a phase windings), or else a phase module, at least permits the negative consequences associated with the malfunction to be able to be reduced, and in some examples even permits further operation of the electrical drive device to be able to be maintained, at least in a restricted manner. To this end, the phase windings are subdivided into the respective first and second part-windings, which are arranged or configured in an electrically isolated manner from one another.

At the same time, on the inverter side, with respect to one of the respective inverter units, it is provided that respective phase modules are formed which are electrically separated from one another and which deliver the same phase of the multi-phase AC electric voltage. As a result, electrically separated operating circuits may be constituted, if the respective part-windings are connected to the respectively assigned phase modules.

If a malfunction occurs in a part-winding or else in a phase module, there is the option for the corresponding switch-out thereof, and for further operation of the electrical drive device to be permitted by the corresponding unimpaired phase module or the correspondingly unimpaired part-winding. At least, by an appropriate operation of the unimpaired phase windings or of the unimpaired phase module, a reduction of the consequences in the impaired part-winding or in the impaired phase module may be achieved.

A rotating electrical machine is a device which converts electrical energy into mechanical energy, (e.g., motion energy), in motor operation, and/or which converts mechanical energy into electrical energy in generator operation. The motion may be a rotary motion, which is executed by the rotor. The stator, by way of distinction from the rotor, may be arranged in a non-rotatable manner, e.g., a rotary motion is a rotary motion of the rotor in relation to the stator.

In a rotating electrical machine, in principle, a stator is provided by way of a stationary element, which may incorporate a circular opening for the accommodation of a rotor which is configured as a rotating element. The rotor is arranged in a rotatably mounted manner in the opening, wherein an air gap is formed between the rotor and the stator. This form of construction is also referred to as an internal rotor. Furthermore, forms of construction are also known, in which the rotor radially encloses the stator. Forms of construction of this type are also called external rotors.

In the regulation operation of the rotating electrical machine, the stator and the rotor are interlinked by a magnetic flux, as a result of which, in motor operation, the force effect, namely the torque, is generated which drives the rotor in rotation in relation to the stator and, in generator operation, mechanical power which is delivered to the rotor in the form of a rotation is converted into electric power. To this end, the stator and the rotor may include a winding through which an electric current flows. In the stator or in the rotor, the winding may also be formed or supplemented by a permanent magnet.

Rotating electrical machines may be rotary field machines connected to a multi-phase, (e.g., a three-phase AC electric voltage grid system), such as, for example, asynchronous machines, synchronous machines, synchronous machines with a damper cage, or the like.

Specifically in multi-phase rotary field machines, in particular having a permanently-excited rotor, it has proved to be problematic if a winding short-circuit occurs within the stator winding. Specifically, in rotating electrical machines of this type, also called synchronous machines, the problem indeed arises that, in the event of a winding short-circuit in regulation operation, a high electric current may be induced which may result in thermal destruction of the stator winding.

Particularly in aircraft, albeit not exclusively, in which permanently-excited rotary field machines are employed, this has proved to be hazardous, as a result of which considerations of an improvement have already been addressed in the prior art, specifically for example in the publication "A Comparative Permanent Magnet and Switched Reluctance Motor for High-Performance Fault-Tolerant Applications" by A. G. Jack et al., IEEE transactions and industry applications, Vol. 32, Number 4, July/August 1996. As a result of the study disclosed herein, improvements have been achieved, although outstanding problems remain.

According to the prior art, such outstanding problems have previously been resolved by complex mechanical devices, for example, structures, which, in the event of a fault, mechanically enlarge the air gap by the moveable rotor and/or stator, reinforced insulation or else a corresponding electromagnetic design, for example, by incorporating single-layer windings or the like, as a result of which, however, impairments of the efficiency and/or of the power density of the rotating electrical machine may occur.

As disclosed herein, it is possible to eliminate the above-mentioned disadvantages, without the necessity for the employment of the measures, in particular the complex mechanical devices, which have previously been employed in the prior art. Redundancy may indeed be provided, which permits the reliability of the rotating electrical machine, and thus also that of the electrical drive device, to be significantly improved.

An inverter is a form of an electrical energy converter, by which electrical energy on the DC voltage side may be converted into electrical energy on the AC voltage side, specifically in particular into a multi-phase AC electric voltage, e.g., a three-phase AC electric voltage. Nowadays, inverters in the form of so-called static energy converters are employed, meaning that, conversely to dynamic energy converters, these incorporate no mechanically moveable, in particular no rotatable parts. Inverters of the generic type, in the form of static energy converters, may be configured as switched-mode electronic energy converters and, to this end, include one or more half-bridge modules. Half-bridge modules of this type include at least two series-connected semiconductor switches, by which a DC electric voltage which is delivered by an intermediate DC voltage circuit may be converted into an AC electric voltage. A circuit topology of this type is also referred to as a half-bridge circuit. An inverter of this type is designed for so-called single-phase operation, meaning that it delivers a single AC electric voltage. An advantageous configuration of such an inverter includes two half-bridge modules which are parallel-connected to the intermediate DC voltage circuit and which are operated in phase opposition, as a result of which the magnitude of the AC voltage generated may be doubled. A circuit topology of this type is also referred to as a full-bridge circuit.

If the function of the inverter—as in the present case—is the delivery of a multi-phase, (e.g., a three-phase AC voltage), at least one half-bridge circuit or a full-bridge circuit is thus provided for each phase of the multi-phase AC voltage. The inverter then includes an inverter unit for each of the phases, which at least includes the half-bridge circuit or the full-bridge circuit.

In order that the inverter units of the inverter are able to deliver the desired phase of the multi-phase AC voltage, the inverter units are controlled by the control unit in an appropriate manner, e.g., such that the semiconductor switches thereof are operated during appropriate switched-mode operation. Switched-mode operation may be based on pulse-width modulation (PWM).

In the present case, the control unit is configured to control the inverter units by the application of vector control. Vector control is a control concept, in which at least substantially sinusoidal periodic variables, for example alternating currents, alternating voltages and/or the like, are regulated, not directly according to their instantaneous temporal value, but according to an instantaneous value which is corrected by a phase angle within a period. To this end, the periodic variables detected are in each case transformed into a coordinate system which rotates at a frequency of the periodic variables. Within the rotating coordinate system, zero-frequency variables are then derived from the periodic variables, to which the customary control engineering methods may be applied.

For the rotating coordinate system, it is provided that two mutually perpendicular axes d and q may be selected. This has the advantage that the coordinate system, in its space vector representation of alternating voltages and alternating currents and the relationship thereof to one another, is identical, as a result of which the models of rotating electrical machines may be directly employed.

Occasionally, vector control is also referred to as field-oriented control. In an inverter for a rotating electrical machine, it permits the achievement of an extended range of rotational speed and positional accuracy. It is particularly suited to the application of inverters which are connected to rotating electrical machines having a permanently-excited rotor, also referred to as synchronous machines. A q-value may represent a torque of the rotating electrical machine, and a d-value may represent a magnetic flux density of the rotating electrical machine.

For each phase of the multi-phase AC electric voltage, at least one phase winding of the rotating electrical machine may be provided. Within the meaning of the present disclosure, the term "phase" thus refers to an alternating voltage. However, depending on the pole pair number, two or more phase windings may also be provided for each phase of the multi-phase AC electric voltage. The phase windings of the rotating electrical machine constitute the stator winding. The disclosure is particularly intended for rotating electrical machines that include a permanently-excited rotor. In principle, however, the concept of the disclosure is also suitable for other rotating electrical machines, in particular, also naturally suitable for synchronous machines in which the rotor is externally excited.

As each of the phase windings is subdivided into two part-windings, a corresponding magnetic functionality may thus be delivered by each of the part-windings such that, in the event of a malfunction of one of the two part-windings, the other one of the part-windings may maintain the functionality at least in a restricted manner. The part-windings may be identically configured. Depending on the structural design of the rotating electrical machine, however, deviations herefrom may also be provided, which permit any further specific structural features to be taken into account.

The phase winding may be arranged in slots and/or on teeth of the plate stack. The corresponding part-windings of one of the respective phase windings may be arranged in the same slots or on the same teeth of the plate stack. Electrical insulation of the two part-windings may be constituted by appropriate insulating materials, for example insulating films, insulating plates of appropriate electrically insulating materials such as mica, plastic, ceramics and/or the like. Naturally, correspondingly appropriate composite materials may also be provided for this purpose.

The first and the second phase module deliver the respective electrical phase of the multi-phase AC electrical voltage in a separate and mutually electrically separated manner. Accordingly, the part-windings may also be operated in a mutually electrically separated manner. The first electrical phase module and the second electrical phase module may also be connected to different intermediate DC voltage circuits of the inverter or the inverter units thereof, such that any reciprocal electrical effect between the phase modules on the DC voltage side, particularly in the event of the occurrence of a malfunction, may be substantially prevented. It is thus possible for the first and the second phase module, in combination with the first and the second part-winding, to be operated in a virtually electrically independent manner from one another.

In this manner, particularly in a permanently-excited rotating electrical machine or synchronous machine, it may be prevented that, in the event of a winding short-circuit in the region of a phase windings or a part-winding of one of the phase windings, by the instances of action of electromagnetic force, the short-circuit continues to be energized with electric power, if the rotor continues to rotate, even if the electric voltage applied to the respective part-winding is disconnected. Naturally, this is particularly advantageous in applications in which the electrical drive device functions as a drive in an aircraft or else in a wind turbine in which, in the event of a fault or the occurrence of a malfunction, the rotating electrical machine continues to rotate, (e.g., on the grounds of a wind-milling effect or the like), or else must continue to be rotated, (e.g., if the rotating electrical machine is operated in combination with other rotating electrical machines or winding systems). Specifically in such cases, the malfunction or a short-circuit may be interrupted or limited, as a result of which damaging consequences may be reduced or prevented, for example, a fire in an airplane as an aircraft, or the like. In particular, the intrinsic safety of the electrical drive device may be substantially improved.

By appropriate design, in the event of a short-circuit, for example, a short-circuit current may be restricted to a low value, or else consequences, for example, generation of heat or the like, may be limited.

According to a basic concept of the disclosure, it is thus provided that the stator winding of the rotating electrical machine is executed in a two-fold arrangement and is energized with AC voltage by separate phase modules.

As disclosed herein, it is further proposed that the phase modules of one of the respective inverter units are thermally coupled to a cooling device which is assigned to the phase modules. By this configuration, it is permitted that, in the event of a malfunction, in response to which one of the phase modules is to be deactivated, the available cooling capacity may be made available to the second of the phase modules, (e.g., in full), as a result of which the second of the phase modules may be operated at an increased capacity. As a result, the consequences of the malfunction may be reduced, while the electrical drive device continues to operate. To this end, it may be provided that, by a judicious arrangement of semiconductor switches of the phase modules, the common utilization of the cooling device may be achieved or improved.

It has proved to be particularly advantageous if each of the phase modules is individually controlled by the application of vector control. This permits the phase modules to be operated in a virtually independent manner from one another and, particularly in the event of a malfunction, by the appropriate adaptation of vector control, to control that of the two phase modules which remains in service in an appropriate manner, such that the consequences of the malfunction, which may result in the deactivation of the other of the two phase modules, are reduced or prevented. To this end, it may be provided that the control unit controls the phase modules in a corresponding manner by appropriate control signals. It may in this case be provided that the control unit includes at least one detector unit, by which the malfunction may be detected. The detector unit may include a current sensor, a voltage sensor, a power sensor, a temperature sensor, a leakage current sensor, and/or the like. It has proved to be particularly advantageous if the control unit provides dedicated vector control for each of the phase modules. Naturally, in the case of unimpaired operation, it may also be provided that a number of, or even all, the phase modules are controlled by common vector control. As a result, the complexity of control for regulation and unimpaired operation of the electrical drive device may be reduced.

The first and the second part-winding of one of the respective phase windings may receive the same magnetic flux. This has the advantage that, by either of the two part-windings, it is possible to act on the relevant portion of the magnetic flux. This moreover permits the detection of asymmetries in regulation operation between the two part-windings, and the employment thereof for the detection of a malfunction. This has proved to be particularly advantageous if the part-windings are identically configured, e.g., include the same number of turns and/or the same cross-sectional area. This moreover permits the detection of asymmetries in regulation operation between the two part-windings, and the employment thereof for the detection of a malfunction.

It is further proposed that the first phase module and the second phase module of one of the respective inverter units are operated independently of one another. It may thus be achieved that the first and the second part-winding of one of the respective phase windings may also be operated independently of one another. The possibility is thus provided whereby, in the event of a malfunction in the region of one of the part-windings or one of the phase modules, the malfunction may be counteracted by the other of the respective part-windings or the other of the respective phase modules by appropriate control measures by way of the control unit.

According to one further development, it is proposed that a malfunction is detected on at least one of the part-windings, and the control of at least one of the phase modules which is assigned to the respective phase windings is adjusted in accordance with the malfunction detected, and/or that of the phase modules which is connected to the part-winding which is affected by the malfunction is deactivated. The malfunction may be detected by the detection unit. A malfunction detected may be transmitted to the control unit by a control signal, which control unit then executes a control of the corresponding phase modules which are affected by the malfunction. The malfunction may be assigned to one respective phase windings or the inverter units. Control may then address the affected inverter unit or the two phase modules thereof in a targeted manner, and prompt corresponding control. As a result, it is not necessary for the further inverter units or the phase modules thereof to be influenced with respect to control. If necessary, however, an influence in the control may also be provided here.

It may be provided that the phase module, to which the part-winding which is affected by the malfunction is connected, is deactivated or disconnected. In this case, the corresponding part-winding is then no longer energized with the phase of the multi-phase AC voltage. At the same time, it may be provided that, depending on the malfunction detected, the other of the two associated phase modules is controlled in an adapted manner. It is thus possible for the impact of the malfunction to be counteracted. As a result, it is further possible for at least partial operation of the electrical drive device to be able to be further maintained.

According to a further development, it is proposed that, upon the detection of a short-circuit in the form of a malfunction on one of the first and the second part-winding of one of the respective phase windings, the phase module which energizes that of the first and the second part-winding which is unimpaired with the respective phase is operated in a field attenuation mode. It may thus be achieved that the magnetic flux which is directed to that of the first and the second part-windings which are correspondingly impaired is reduced such that, even in the event of a disconnected corresponding phase module, the consequences of the short-circuit in the impaired part-winding may be reduced. Accordingly, the risk of any propagation of damage, particularly of a fire, may be reduced.

It is further proposed that, upon the detection of a short-circuit during the regulation operation of the electrical drive device, the operation of the phase module is switched from a torque delivery mode to a field attenuation mode. This may be achieved by a corresponding switchover. As a result, a simple option is provided for the reduction of the consequences of the short-circuit upon the electrical drive device, particularly the rotating electrical machine.

It is further proposed that that of the phase modules connected to the part-winding affected by the malfunction, depending on the malfunction detected, the phase module is operated in a field attenuation mode. In this case, the phase module compromised by the affected part-winding is not disconnected, but instead remains in service. The continuing service is executed such that a field attenuation operating mode is provided, so that the consequences of the malfunction, particularly of a short-circuit, may be reduced.

It is also possible for the field to be only partially attenuated, and for additional torque to be generated. The additional torque generation may be determined in accordance with an electrical resistance of the short-circuit. Thus, for example, a still acceptable magnetic flux and/or a short-circuit current may be considered. This may be determined, for example, by a flux measurement, and employed for the operation of the inverter.

The option is further provided for the location of a fault or a malfunction, in that respective temperature and/or current values in the independent part-windings of the phase windings are mutually compared. By the two-fold execution of the independent phase windings, in the event of fault-free operation, the values in respective part-windings may be of approximately equal magnitude.

According to a further advantageous configuration, it is proposed that a working frequency of at least one of the phase modules is increased and/or a switching speed of a semiconductor switching element of one of the respective phase modules is reduced. It may thus be achieved that, for example, a current ripple, which is generated by switching operations on the affected inverter unit and which may occur on the grounds that, on the supply side, symmetrical loading of the phase modules is no longer present, may be reduced. Support may be provided here by the increase in the switching frequency and, alternatively or additionally, also by an adjustment or a reduction in a switching speed or a switching edge steepness of the semiconductor switches. However, increased losses may occur in the corresponding phase module as a result, although these may be reduced by the common coupling of both phase modules to an associated cooling device. Overall, a higher loading capability for that of the phase modules which is kept in service may be achieved as a result.

The advantages and effects disclosed with respect to the electrical drive device apply correspondingly to the method, and vice versa. Moreover, for characteristics of the device, corresponding characteristics of the method may be formulated, and vice versa.

BRIEF DESCRIPTION OF THE DRAWINGS

Further advantages and characteristics proceed from the following exemplary embodiments with reference to the attached figures. In the figures, identical reference symbols identify identical characteristics and functions.

In the Figures.

DETAILED DESCRIPTION

Figure 1:
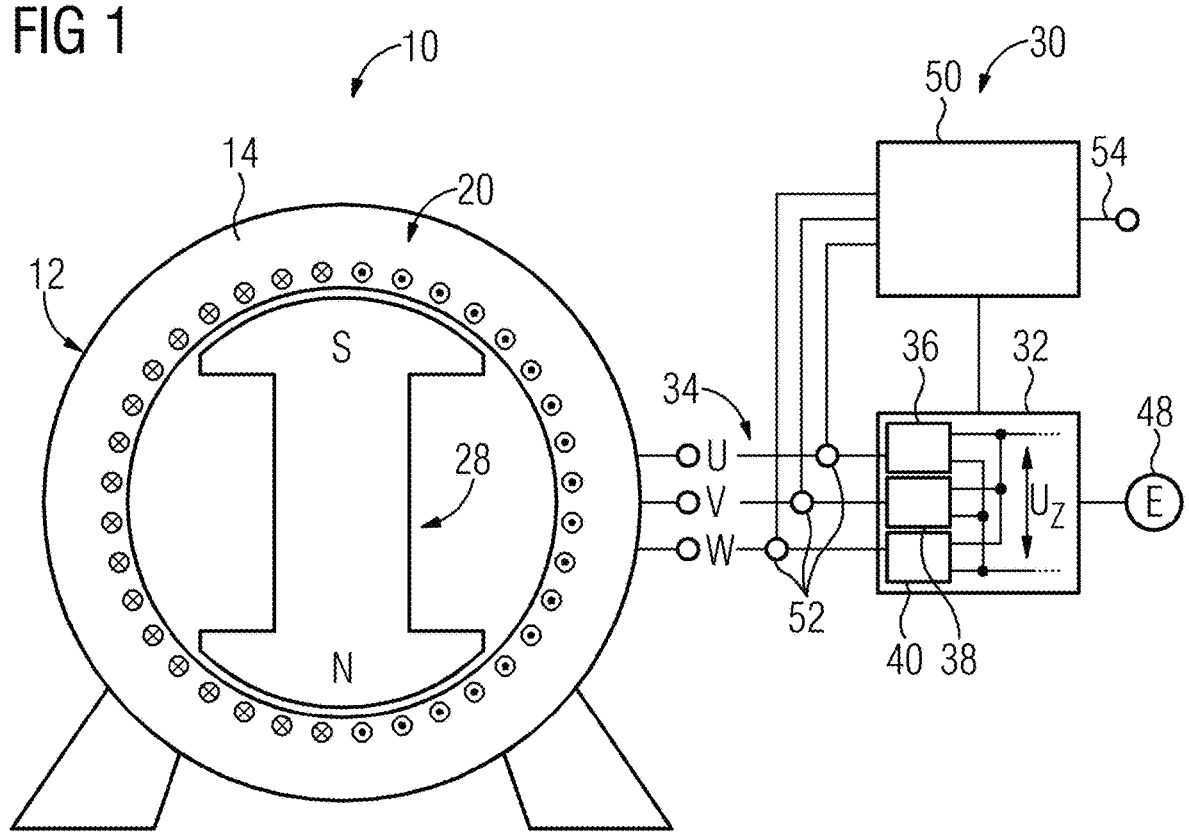
FIG. 1 shows a schematic block diagram of an electrical drive device, according to an example.

FIG. 1 shows a schematic block diagram representation of an electrical drive device 30 which, in the present case, includes a synchronous machine 10 in the form of a rotating electrical machine, which includes a stator 12 and a rotor 28 which is arranged in a rotatable manner in relation to the stator 12. In the present configuration, the synchronous machine 10 is represented as an internal-field machine. In the present case, the rotor 28 is a permanently-excited rotor.

The stator 12 includes a plate stack 14 and a stator winding 20. In the present case, the stator winding 20 includes three phase windings 22. The phase windings 22 are arranged so as to be rotated in a circumferential direction through approximately 120° about an axis of rotation of the rotor 28. The synchronous machine 10 is thus configured for operation with a three-phase AC voltage 34 and an energy source 48.

The three-phase AC voltage 34 is delivered by an inverter 32 of the electrical drive device 30. To this end, the inverter 32, for one of the respective phases U, V, W of the three-phase AC electric voltage 34, includes at least one inverter unit 36, 38, 40, which is assigned to the respective phase U, V, W, for each phase U, V, W. One of the inverter units 36, 38, 40 is connected to each of the phase windings 22, such that the respective phase winding 22 is energized by the energy source 48 with the correspondingly assigned phase U, V, W of the three-phase AC electric voltage 34.

A control unit 50 is further provided, which is configured to control the inverter units 36, 38, 40 by the application of vector control. To this end, current sensors 52 are provided for each of the phases U, V, W of the three-phase AC electric voltage 34, which are connected to the control unit 50. A control terminal 54 of the control unit 50 is provided, which is not specified in any greater detail, by which a control signal with respect to the regulation operation of the electrical drive device 30 may be fed to the control unit 50. The control unit 50 evaluates the control signal and, for each of the inverter units 36, 38, 40, generates corresponding inverter control signals, by which the inverter units 36, 38, 40 may be controlled in an appropriate manner for the delivery of their respective phase U, V, W.

No further representation is included in the figures to the effect that the synchronous machine 10 includes a position sensor, which is also connected to the control unit 50, in order to permit the delivery of a signal which corresponds to a position of the rotor 28. This signal is taken into account by the control unit 50 for the vector control of the respective inverter units 36, 38, 40.

Figure 2:
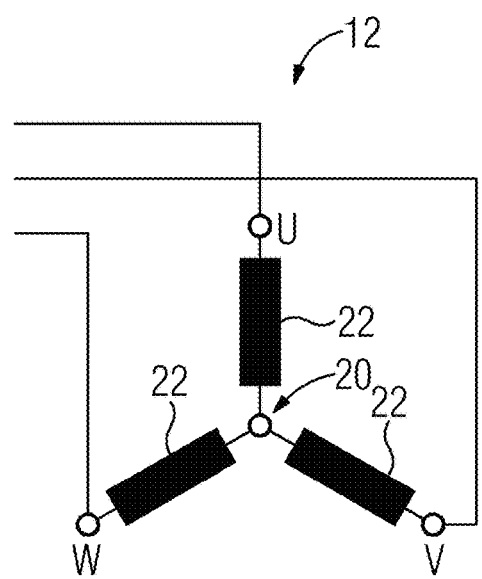
FIG. 2 shows a schematic equivalent circuit diagram of a stator winding of a synchronous machine of the electrical drive device according to FIG. 1, according to an example.

FIG. 2 shows a schematic equivalent circuit diagram of the stator winding 20 with the phase windings 22 for three-phase operation. Although FIG. 2 schematically represents a star-connected arrangement of the phase windings 22, it is provided that the neutral point is not configured in practice. Each of the phase windings 22, at its two respective terminals, is directly connected to the associated one of the inverter units 36, 38, 40, as represented in FIG. 1. Accordingly, the neutral point represented in FIG. 2 is to be considered as virtual only.

Figure 3:
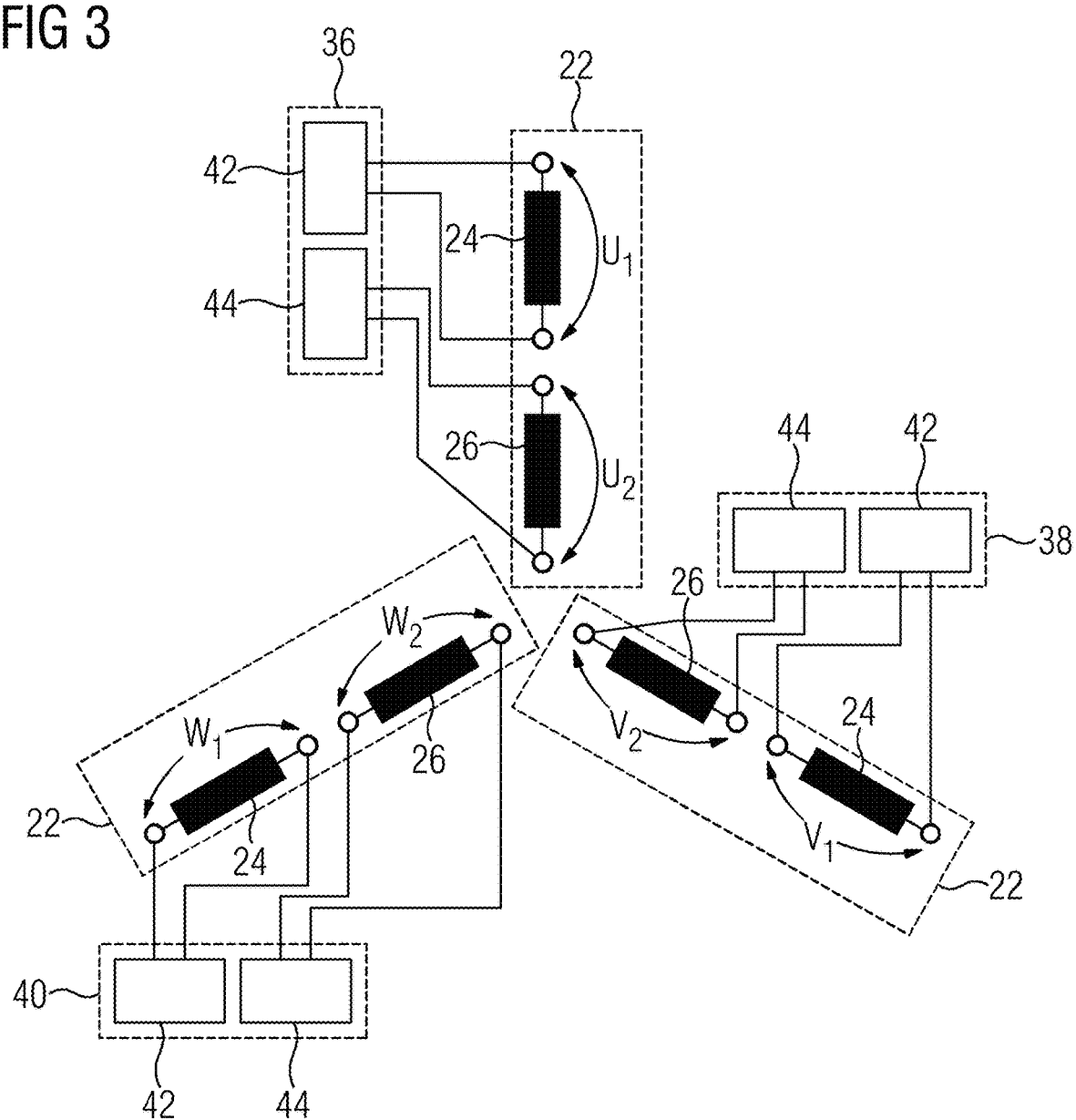
FIG. 3 shows a schematic equivalent circuit diagram based on FIGS. 1 and 2, in which the phase windings and the inverter units are configured in a 2-part arrangement according to an example.

FIG. 3 shows an enlarged, more detailed representation of a section of the schematic block diagram representation in FIG. 1. As may be seen in FIG. 3, each of the phase windings 22 includes a first part-winding 24 and a second part-winding 26, which is electrically isolated from the first part-winding 24. Moreover, the inverter units 36, 38, 40 which are assigned to the respective phases U, V, W respectively include a first and a second phase module 42, 44.

The phase modules 42, 44 of one of the respective inverter units 36, 38, 40 are configured to deliver the electrical phase U, V, W of the three-phase AC electric voltage 34 which is assigned to the respective inverter unit 36, 38, 40 in a separate and mutually electrically isolated manner. Accordingly, the respective associated one of the phase modules 42, 44 delivers the same phase in each case. The control unit 50 actuates the phase modules 42, 44 correspondingly.

No representation is included in FIG. 3 to the effect that the phase modules 42, 44 include respective full-bridge circuits with semiconductor switches, in order to correspondingly deliver the respective one of the phases U, V, W in switched-mode operation. Accordingly, the phase module 42 of the inverter unit 36 delivers a first phase $U_1$, and the phase module 44 of the same inverter unit 36 delivers the phase $U_2$. In the present case, the frequency, phase angle and also amplitude of the phases $U_1$ and $U_2$ are equal. The same applies, correspondingly, to the further inverter units 38 and 40, and to the further phase windings 22 which are connected thereto.

The phase modules 42, 44 of one of the respective inverter units 36, 38, 40 are operated such that the part-windings 24, 26 of one correspondingly associated phase windings 22 cooperate, in the manner of a single one-part phase windings 22 according to the prior art. In the present case, it is therefore provided that the part-windings 24, 26 receive the respectively same magnetic flux, and also provide the same number of turns and also the same cross-sectional area. In unimpaired regulation operation, the magnetic effect of the part-windings 24, 26 is thus constituted by addition.

The phase modules 42, 44 of one of the respective inverter units 36, 38, 40 are configured to deliver the electrical phase U, V, W of the three-phase AC electric voltage 34 which is assigned to the respective inverter unit 36, 38, 40 in a separated and mutually electrically isolated manner. To this end, the respective first part-winding 24 is electrically connected to the corresponding first phase module 42 and the respective second part-winding 26 is electrically connected to the corresponding second phase module 44.

Figure 4:
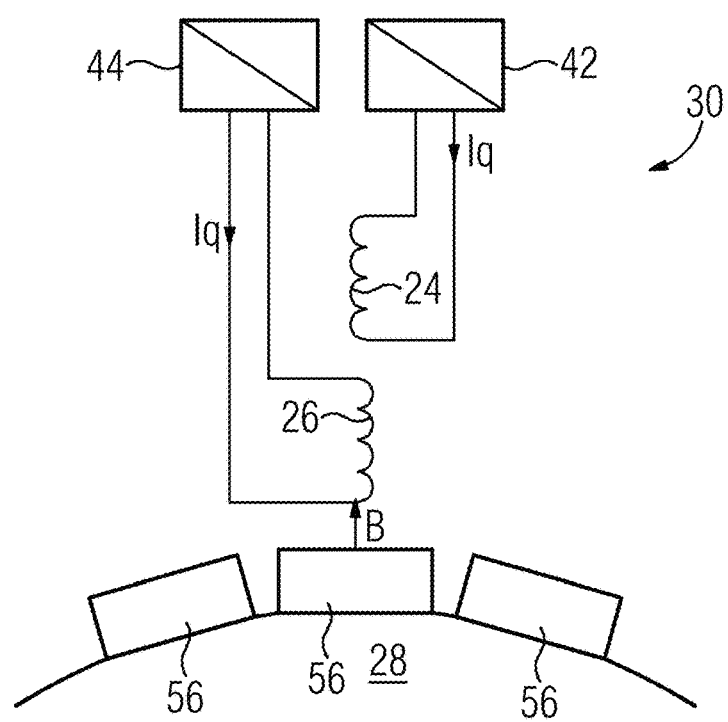
FIG. 4 shows a schematic block representation for illustrating the function of the disclosure with reference to a single one of the phase windings according to FIG. 3, according to an example.

FIG. 4 shows a schematic block representation of the action of the electrical drive device 30 in regulation unimpaired operation. As has already been seen from FIG. 3, the phase windings 22 are configured in a two-part arrangement, as are the inverter units 36, 38, 40. Each of the part-windings 24, 26, by the corresponding phase module 42, 44, is energized with the respective phase U, V, W. It should be observed here that the term "phase" within the meaning of the present disclosure signifies an AC voltage which is assigned to the respective phase and which has a corresponding phase angle.

The part-windings 24, 26, with respect to their magnetic effect, are arranged one behind another or else one inside the other. As a result, both part-windings 24, 26 may be received by the same magnetic flux.

In regulation operation, as a result, parallel operation may be executed. Only the two-fold execution of the connection lines to the part-windings 24, 26 requires a corresponding increased complexity.

From FIG. 4, it may further be seen that, for the delivery of a desired torque in accordance with the vector control, each of the part-windings 24, 26 is energized by the respective phase module 42, 44 with a corresponding current $I_q$ in accordance with the vector control. The magnetic effect thus delivered by the part-windings 24, 26 is interlinked with a rotor magnetic field, which is delivered by permanent magnets 56 which are arranged on the outer perimeter of the rotor 28. To this end, the permanent magnets 56, with respect to their orientation of the magnetic field, are arranged in an alternating manner in the circumferential direction of the rotor 28.

Figure 5:
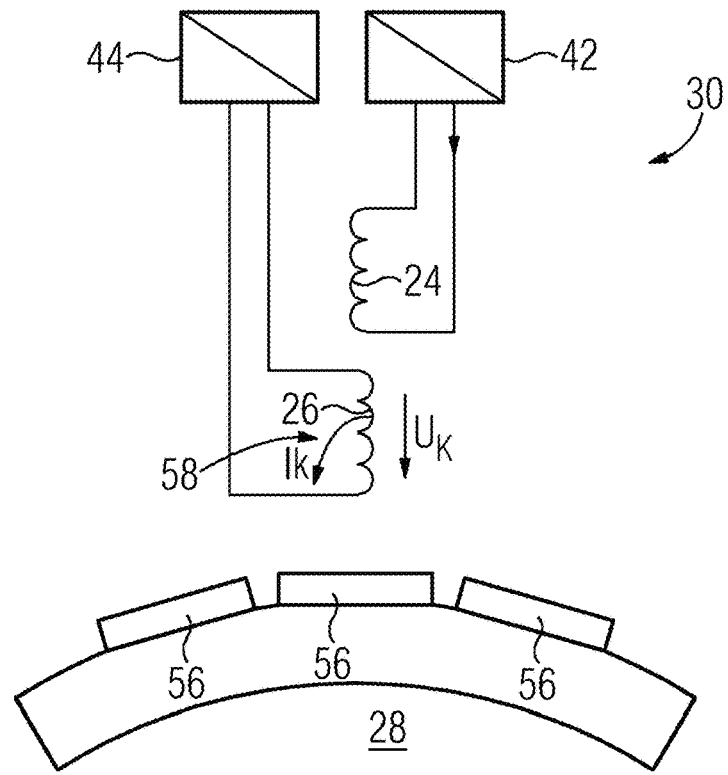
FIG. 5 shows a representation similar to FIG. 4, wherein an internal short-circuit has occurred in a part-winding of the phase windings, according to an example.

With reference to FIG. 5, the advantageous action of the disclosure may now be described in an exemplary manner. FIG. 5 shows a representation similar to FIG. 4, wherein, however, the second part-winding 26 is now affected by a winding short-circuit 58. This is identified in FIG. 5 by $I_k$.

The winding short-circuit 58 may be detected by a detector, which is not represented in any further detail. A corresponding detection signal is made available to the control unit 50. In response, the control unit 50 deactivates the phase module 44, such that the electric current delivered by the phase module 44 for the second part-winding 26 is zero.

As the short-circuit occurs during regulation operation, and the rotor 28 is permanently excited, the rotation of the rotor 28 continues to generate an alternating magnetic field in the second part-winding 26, which leads to a situation whereby, notwithstanding the winding short-circuit 58, an electric voltage $U_k$ is induced in the second part-winding 26, which leads to a situation whereby a current flows in the second part-winding 26 which is affected by the winding short-circuit 58, which current may result in unwanted heat-up and further damage.

The possibility is now provided that, by the control unit 50, the other one of the phase modules 42 is operated in a field attenuation mode. Correspondingly, a current, delivered by the phase module 42, for the first part-winding 24 may incorporate a current component $I_d$ which is lower than zero. As the first and the second part winding 24, 26 receive the same magnetic flux, the magnetic flux may thus overall be reduced, as a result of which the induced voltage $U_k$ may then also be reduced. The flux may be fully compensated, such that the damaging action of the induced voltage $U_k$ may be substantially prevented.

Independently hereof, it is naturally also possible that, in the event of the failure of one of the phase modules 42, 44, further operation of the electrical drive device 30 may be achieved by the respectively other one of the phase modules 42, 44.

The winding short-circuit 58 may occur within one of the respective part-windings 24, 26, or else on connection terminals of the part-windings 24, 26, for example in a terminal box or the like.

It may be provided that, in regulation operation, a short-circuit which occurs during operation is detected, and a current which energizes the respective one of the part-windings 24, 26 is switched over from a torque-generating current $I_q$ to a field-attenuating current $I_d$<0.

In principle, it is naturally also possible for the magnetic flux to be only partially attenuated, and at the same time for an additional torque to be delivered. The additional torque delivery may be determined in accordance with an electrical resistance of the winding short-circuit. This may be achieved by a measurement of the magnetic flux and/or the like.

The detection of a winding short-circuit may be executed by various measures. Thus, for example, a value of the current, and also a current characteristic, particularly a current characteristic curve, may be evaluated. To this end, appropriate current sensors may be arranged at correspondingly appropriate locations on the rotating electrical machine, in this case the synchronous machine 10. Moreover, it is possible for magnetic field measurements to be employed for this purpose. To this end, appropriate magnetic field sensors may be arranged at correspondingly appropriate locations on the rotating electrical machine. For example, sense coils may be employed for this purpose, for example in the manner of voltage-based flux sensors or the like, which detect an induced voltage in each of the phases U, V, W of the three-phase AC voltage 34 and determine therefrom the corresponding magnetic flux. Moreover, there is the possibility of a voltage measurement on terminals of the part-windings 24, 26, and also the option for the determination of a temperature by appropriate temperature sensors at locations which are conducive to this purpose on the rotating electrical machine. In particular, a malfunction may be identified in that two temperature/current values in different respective phase windings 22 are compared with one another. In unimpaired operation, on the grounds of symmetry, equal values may be observed in this case. Any deviation therefore indicates a corresponding malfunction.

No representation is included in the figures to the effect that, as a result of the measures provided on the phase modules 42, 44, in particular with respect to the current $I_d$, in the unimpaired system, current ripples generated in the event of a malfunction may be greater, as they may no longer be compensated on the grounds of symmetry. In order therefore to be able to reduce the consequences, a switched-mode frequency of the semiconductor switches of the phase module 42, 44 which is connected to the unimpaired part-winding 24, 26 may be increased, or a switching edge steepness of when switching the semiconductor switches may be reduced.

As a result, greater losses in the corresponding one of the phase modules 42, 44 may occur, although these may be counteracted on the grounds of thermal coupling of both of the associated phase modules 42, 44 to a common cooling device. On the grounds that the phase module 42, 44 which is connected to that of the part-windings 24, 26 which is impaired may be deactivated, no further power loss is offered by the phase module. The cooling capacity thus available may consequently be employed by the other of the two phase modules 42, 44. As a result, the increased power loss may be dissipated.

The exemplary embodiments serve only to describe the disclosure and should not constitute any limitation of the disclosure.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification. Although the disclosure has been illustrated and described in greater detail by way of the exemplary embodiments, the disclosure is not restricted by way of the disclosed examples, and other variations may be derived therefrom by a person skilled in the art, without departing from the scope of protection of the disclosure.

The invention claimed is:

1. An electrical drive device comprising:
   an inverter configured to deliver a multi-phase AC electric voltage, wherein the inverter is configured to deliver a respective phase of the multi-phase AC electric voltage, wherein the inverter, for each phase, comprises at least one inverter unit assigned to the respective phase;
   a control unit configured to control the inverter units by application of vector control; and
   a rotating electrical machine having a stator and a rotor rotatably arranged in relation to the stator, wherein the stator comprises:
      a plate stack; and
      a stator winding having a plurality of phase windings connected to the respective inverter units, in order to energize the respective one of the phase windings with the correspondingly assigned phase of the multi-phase AC electric voltage,
      wherein each phase winding of the plurality of phase windings comprises a first part-winding and a second part-winding electrically isolated from the first part-winding,
   wherein the inverter units assigned to the respective phases respectively comprise a first phase module and a second phase module,
   wherein the phase modules of one of the respective inverter units are configured to deliver an electrical phase of the multi-phase AC electric voltage assigned to the respective inverter unit in a separate and a mutually electrically isolated manner, and
   wherein the respective first part-winding is electrically connected to the corresponding first phase module and the respective second part-winding is electrically connected to the corresponding second phase module,
   wherein the control unit is configured to detect a malfunction on at least one part-winding of the part-windings, and
   wherein control of at least one of the phase modules assigned to the respective one of the phase windings is adjusted in accordance with the malfunction detected, wherein a phase module connected to the part-winding affected by the malfunction is deactivated, or a combination thereof.

2. The electrical drive device of claim 1, wherein the rotor is configured to be permanently excited.

3. The electrical drive device of claim 2, wherein the phase modules of one of the respective inverter units are thermally coupled to a cooling device assigned to the phase modules.

4. The electrical drive device of claim 1, wherein the phase modules of one of the respective inverter units are thermally coupled to a cooling device assigned to the phase modules.

5. The electrical drive device of claim 1, wherein the control of the at least one of the phase modules assigned to the respective one of the phase windings is adjusted in accordance with the malfunction detected.

6. The electrical drive device of claim 1, wherein the phase module connected to the part-winding affected by the malfunction is deactivated.

7. A method for operating an electrical drive device, the method comprising:
   energizing phase windings of a stator winding of a stator of a rotating electrical machine of the electrical drive device with phases of a multi-phase AC electric voltage which are assigned to respective phase windings, wherein the phases are delivered by respective inverter units of an inverter of the electrical drive device assigned to the phases; and
   controlling the inverter units by an application of vector control,
   wherein each of the phase windings comprises a first part-winding and a second part-winding electrically isolated from the first part-winding,
   wherein the inverter units assigned to the respective phases respectively comprise a first phase module and a second phase module,
   wherein the phase modules of one of the respective inverter units deliver an electrical phase of the multi-phase AC electric voltage which is assigned to the respective inverter unit in a separate and a mutually electrically isolated manner, and
   wherein the respective first part-winding of the corresponding first phase module and the respective second part-winding of the corresponding second phase module are energized with the respectively assigned phases,
   wherein a malfunction is detected on at least one part-winding of the part-windings, and
   wherein control of at least one of the phase modules assigned to the respective one of the phase windings is adjusted in accordance with the malfunction detected, wherein a phase module connected to the part-winding affected by the malfunction is deactivated, or a combination thereof.

8. The method of claim 7, wherein each of the phase modules is individually controlled by the application of vector control.

9. The method of claim 8, wherein the first part-winding and the second part-winding of one of the respective phase windings receive a same magnetic flux.

10. The method of claim 9, wherein the first phase module and the second phase module of one of the respective inverter units are operated independently of one another.

11. The method of claim 8, wherein the first phase module and the second phase module of one of the respective inverter units are operated independently of one another.

12. The method of claim 7, wherein the first part-winding and the second part-winding of one of the respective phase windings receive a same magnetic flux.

13. The method of claim 12, wherein the first phase module and the second phase module of one of the respective inverter units are operated independently of one another.

14. The method of claim 7, wherein the first phase module and the second phase module of one of the respective inverter units are operated independently of one another.

15. The method of claim 7, wherein, upon the detection of a short-circuit in a form of a malfunction on one of the first part-winding and the second part-winding of one of the respective phase windings, the phase module which energizes that of the first part-winding and the second part-winding which is unimpaired with the respective phase is operated in a field attenuation mode.

16. The method of claim 15, wherein, upon the detection of the short-circuit during operation of the electrical drive device, the operation of the phase module is switched from a torque delivery mode to the field attenuation mode.

17. The method of claim 7, wherein the phase module that is connected to the part-winding affected by the malfunction, depending on the malfunction detected, is operated in a field attenuation mode.

18. The method of claim 7, wherein a working frequency of at least one of the phase modules is increased, a switching speed of a semiconductor switching element of one of the respective phase modules is reduced, or a combination thereof.

19. The method of claim 7, wherein the control of the at least one of the phase modules assigned to the respective one of the phase windings is adjusted in accordance with the malfunction detected.

20. The method of claim 7, wherein the phase module connected to the part-winding affected by the malfunction is deactivated.

* * * * *